United States Patent
Naoi et al.

(10) Patent No.: US 11,975,783 B2
(45) Date of Patent: May 7, 2024

(54) WINDSHIELD DEVICE FOR SADDLE-RIDE TYPE VEHICLE

(71) Applicants: Nifco Inc., Yokosuka (JP); HONDA MOTOR CO., LTD., Tokyo (JP)

(72) Inventors: Hajime Naoi, Kanagawa (JP); Shinichiro Ishida, Saitama (JP); Naoki Hara, Saitama (JP)

(73) Assignees: NIFCO INC., Kanagawa (JP); HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 17/440,309

(22) PCT Filed: Dec. 23, 2019

(86) PCT No.: PCT/JP2019/050354
§ 371 (c)(1),
(2) Date: Sep. 17, 2021

(87) PCT Pub. No.: WO2020/194947
PCT Pub. Date: Oct. 1, 2020

(65) Prior Publication Data
US 2022/0144366 A1    May 12, 2022

(30) Foreign Application Priority Data
Mar. 25, 2019 (JP) .................. 2019-056252

(51) Int. Cl.
*B62J 17/04* (2006.01)
(52) U.S. Cl.
CPC .................... *B62J 17/04* (2013.01)

(58) Field of Classification Search
CPC ... B62J 17/04; B62J 17/02; B62J 17/00; B62J 11/00; B60J 1/004
(Continued)

(56) References Cited

U.S. PATENT DOCUMENTS

2016/0251048 A1*  9/2016  Suzuki ................... B62J 17/04
                                                       296/78.1
2016/0251049 A1*  9/2016  Tsuda ..................... B62J 17/04
                                                       296/78.1

FOREIGN PATENT DOCUMENTS

JP    2015182734 A    10/2015
JP    2016159719 A     9/2016
(Continued)

OTHER PUBLICATIONS

English translation of International Search Report for Patent Application PCT/JP2019/050354 mailed Feb. 25, 2020; 2 pp.

*Primary Examiner* — Amy R Weisberg
*Assistant Examiner* — Melissa Ann Bonifazi
(74) *Attorney, Agent, or Firm* — Armstrong Teasdale LLP (57) ABSTRACT

To simplify the configuration, decrease the number of parts, and reduce the manufacturing cost, a windshield device for a saddle-ride type vehicle includes: a screen 5 whose height is adjustable; a holder 11 holding the screen; a bracket 12 fixed to a vehicle body side member 7 and having a guide hole 71; an arm 13 arranged between the holder and the bracket; a first shaft 51 rotatably coupling the holder and the bracket and configured to move along the guide hole; a second shaft 52 arranged parallel to the first shaft and coupling the holder and one end of the arm; a third shaft 53 arranged parallel to the first shaft and coupling the bracket and another end of the arm; and an operation member 15 provided at an end portion of the first shaft.

5 Claims, 7 Drawing Sheets

(58) Field of Classification Search
USPC .............................................. 296/78.1, 77.1
See application file for complete search history.

(56) References Cited

FOREIGN PATENT DOCUMENTS

| | | |
|---|---|---|
| JP | 2017124808 A | 7/2017 |
| JP | 2017165383 A | 9/2017 |

* cited by examiner

WINDSHIELD DEVICE FOR SADDLE-RIDE TYPE VEHICLE

CROSS-REFERENCE TO RELATED APPLICATIONS

This application is a U.S. National Phase Application of PCT/JP2019/050354 filed Dec. 23, 2019, which claims the benefit of Japanese Patent Application No. 2019-056252 filed Mar. 25, 2019. The contents of these applications are hereby expressly incorporated by reference in their entirety.

TECHNICAL FIELD

The present invention relates to a windshield device arranged in front of a driver in a saddle-ride type vehicle, and more particularly, to a windshield device including a screen (windshield member) whose height is adjustable.

BACKGROUND ART

Conventionally, in a saddle-ride type vehicle, a screen is provided in front of a driver so as to reduce a traveling wind hitting against the driver, and a height of the screen is adjustable so as to improve the convenience of the driver (see Patent Document 1).

PRIOR ART DOCUMENT(S)

Patent Document(s)

Patent Document 1: JP2016-159719A

SUMMARY OF THE INVENTION

Task to be Accomplished by the Invention

By the way, so as to raise and lower the screen, the above-mentioned conventional technique is provided with left and right supporting members supporting the screen, an operation lever operated by the driver, left and right rail brackets each having a guide hole, and a coupling member coupling the rail brackets and the supporting members. The supporting members and the coupling member are rotatably connected, the coupling member and the rail brackets are movably connected, and a guide protrusion of each supporting member slides in the guide hole of each rail bracket and in an elongated hole of the operation lever. Further, a lock mechanism is provided so as to maintain the height of the screen. In this way, the configuration is complicated, the number of parts is large, and the manufacturing cost is high.

In view of the above background, an object of the present invention is to simplify the configuration, decrease the number of parts, and reduce the manufacturing cost, in a windshield device for a saddle-ride type vehicle including a screen whose height is adjustable.

Means for Accomplishing the Task

To achieve such an object, one aspect of the present invention provides a windshield device (1) arranged in front of a driver in a saddle-ride type vehicle (2), the windshield device including: a windshield member (5) arranged such that at least one of a height and an angle thereof is adjustable; a holding member (11) holding the windshield member; an attachment member (12) fixed to a vehicle body and having a guide hole (71); a connecting member (13) arranged between the holding member and the attachment member; a first shaft member (51) rotatably coupling the holding member and the attachment member and configured to move along the guide hole; a second shaft member (52) arranged parallel to the first shaft member and coupling the holding member and one end of the connecting member; a third shaft member (53) arranged parallel to the first shaft member and coupling the attachment member and another end of the connecting member; and an operation member (15) provided at an end portion of the first shaft member.

According to this aspect, a height of the windshield member can be smoothly changed by a simple configuration, namely, by a combination (slide mechanism with three joints) of a link structure with three axes and a slide structure with one axis. Also, when a driver grips and operates the operation member provided at the end portion of the first shaft member, the first shaft member moves along the guide hole and the holding member is raised/lowered, so that the height of the windshield member can be adjusted. Accordingly, it is possible to simplify the configuration, decrease the number of parts, and reduce the manufacturing cost.

In the above aspect, preferably, the operation member (15) is configured to slide with respect to the first shaft member (51) in an axial direction thereof and to shift between a lock state to restrict a movement of the first shaft member and a lock release state to permit the movement of the first shaft member.

According to this aspect, the driver can release and restore the lock state by operating the operation member in the axial direction. Accordingly, the operability is improved by a simple configuration.

In the above aspect, preferably, the guide hole (71) is provided with at least two lock portions (72) formed wider than other portions thereof, the operation member (15) includes a fitted portion (62) configured to be fitted to each lock portion, and when the fitted portion is fitted to the lock portion, the lock state to restrict the movement of the first shaft member along the guide hole is generated.

According to this aspect, it is possible to reliably restrict the movement of the first shaft member and to maintain the lock state. Accordingly, the operability is improved by a simple configuration.

In the above aspect, preferably, at least one of the lock portion (72) and the fitted portion (62) is gradually tapered in a direction in which the fitted portion is fitted to the lock portion, and a biasing member (82) configured to bias the operation member (15) in a direction in which the fitted portion comes in pressure contact with the lock portion is provided.

According to this aspect, it is possible to reliably hold the operation member in the lock state. Further, the lock state is released by a pulling operation on the operation member against a biasing force of the biasing member, and the lock state (initial state) is restored by the biasing force of the biasing member when the pulling operation on the operation member is stopped. Accordingly, the operability is improved by a simple configuration.

Effect of the Invention

Thus, according to the above aspects, it is possible to smoothly change the height of the windshield member by a simple configuration, namely, by a combination (slide mechanism with three joints) of a link structure with three axes and a slide structure with one axis. Also, when a driver grips and operates the operation member provided at the end portion of the first shaft member, the first shaft member moves along the guide hole and the holding member is raised/lowered, so that the height of the windshield member can be adjusted. Accordingly, it is possible to simplify the configuration, decrease the number of parts, and reduce the manufacturing cost.

MODE(S) FOR CARRYING OUT THE INVENTION

In the following, with reference to the drawings, an example in which an embodiment of the present invention is applied to a motorcycle (saddle-ride type vehicle) will be described.

Figure 1:
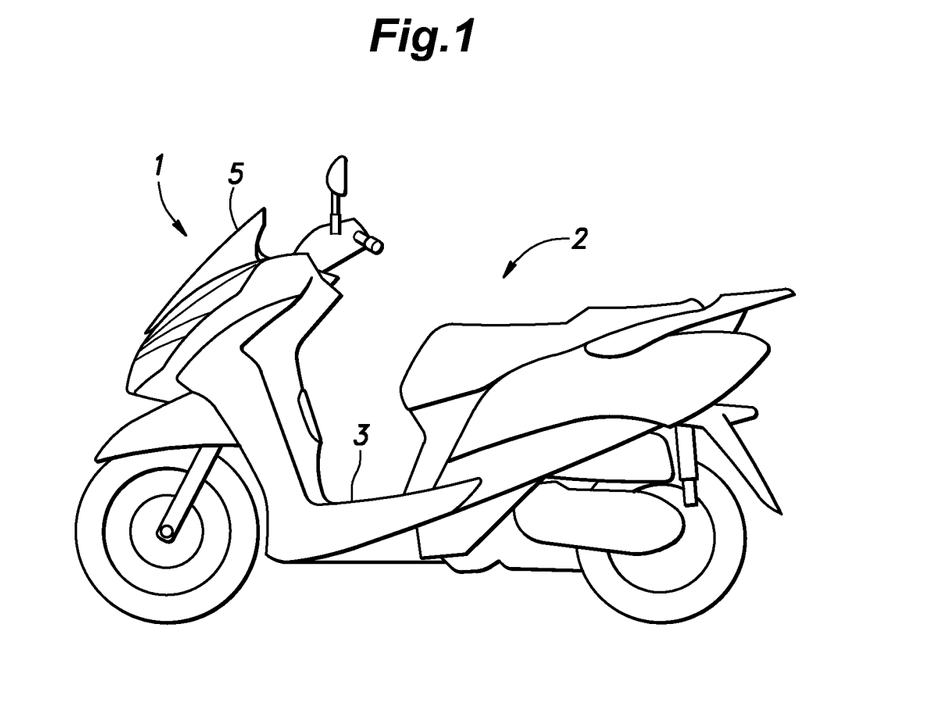
FIG. 1 is a side view showing a state where a windshield device according to an embodiment is applied to a motorcycle (saddle-ride type vehicle)

As shown in FIG. 1, a windshield device 1 is provided in a front portion of a vehicle body 3 of a motorcycle 2 (saddle-ride type vehicle). The windshield device 1 includes a screen 5 (windshield member). The screen 5 is arranged in front of a driver so as to reduce a traveling wind hitting against the driver. The screen 5 may be made of a transparent synthetic resin material or a glass material.

Figure 2:
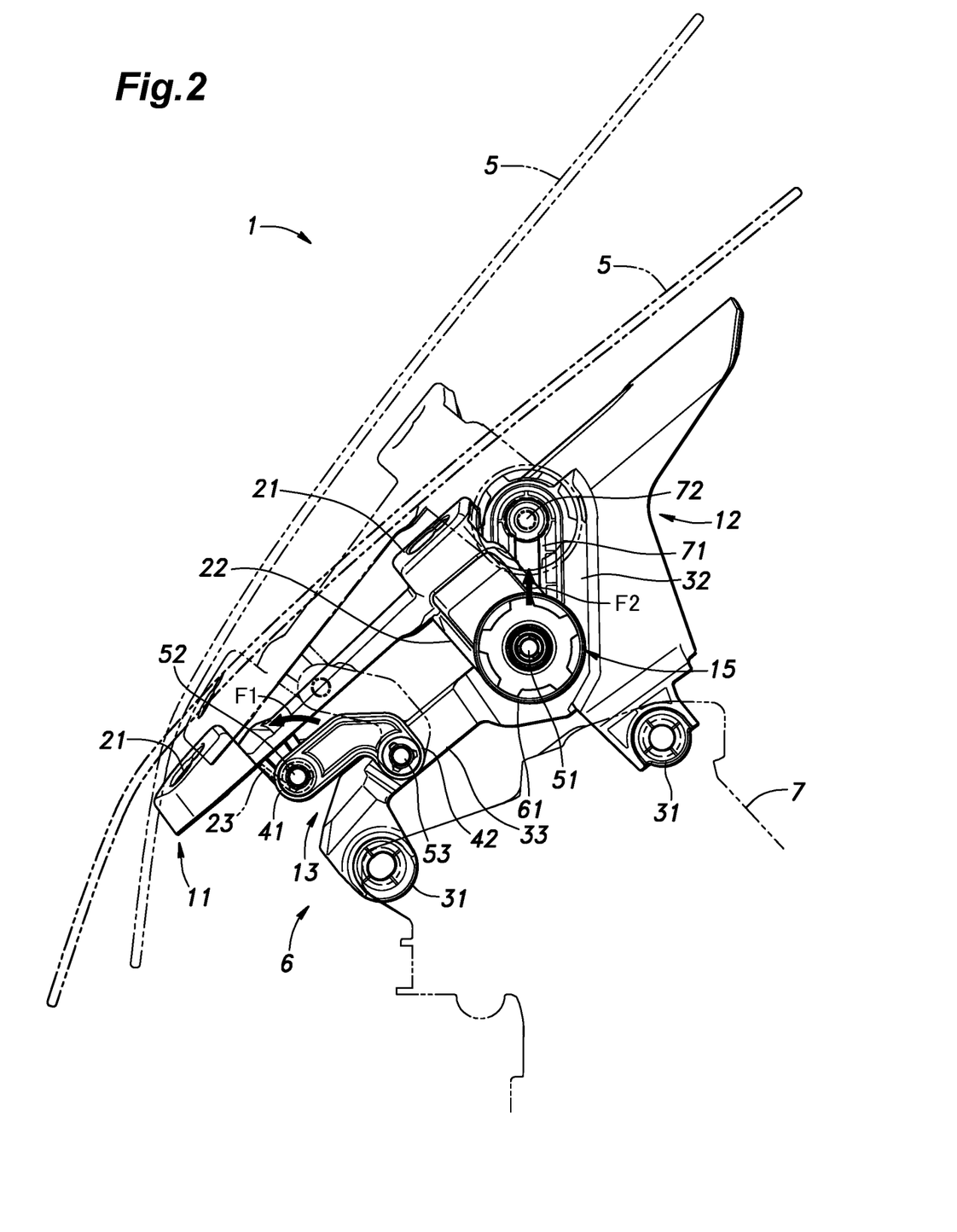
FIG. 2 is a side view showing a screen adjuster.

As shown in FIG. 2, the windshield device 1 includes a screen adjuster 6 configured to adjust a height of the screen 5. In the present embodiment, the screen adjuster 6 can adjust the screen 5 to be in two positions of a low position and a high position.

Incidentally, in the present embodiment, a posture (tilt angle) of the screen 5 changes simultaneously with the height of the screen 5. Further, the driver may adjust the height of the screen 5 according to his/her preference. For example, the driver may select the low position with an emphasis on styling when driving at low speed in an urban area, and may select the high position with an emphasis on a windshield function when driving at high speed on a highway.

Further, in the present embodiment, the height of the screen 5 can be adjusted to two positions of the low position and the high position, but may be adjusted to three or more positions.

The screen adjuster 6 includes a holder 11 (holding member) configured to hold the screen 5, a bracket 12 (attachment member) fixed to a vehicle body side member 7, and an arm 13 (connecting member) arranged between the holder 11 and the bracket 12. The holder 11, the bracket 12, and the arm 13 may be made of synthetic resin materials.

The holder 11 includes a plurality of attachment portions 21 to which the screen 5 is fixed, first hinge portions 22 rotatably and slidably coupled to the bracket 12, and second hinge portions 23 to which the arm 13 is rotatably coupled.

The bracket 12 includes a plurality of attachment portions 31 fixed to the vehicle body side member 7, slide guide portions 32 to which the holder 11 is rotatably and slidably coupled, and a hinge portion 33 to which the arm 13 is rotatably coupled.

The arm 13 includes first coupled portions 41 coupled to the holder 11 and second coupled portions 42 coupled to the bracket 12.

Figure 3:
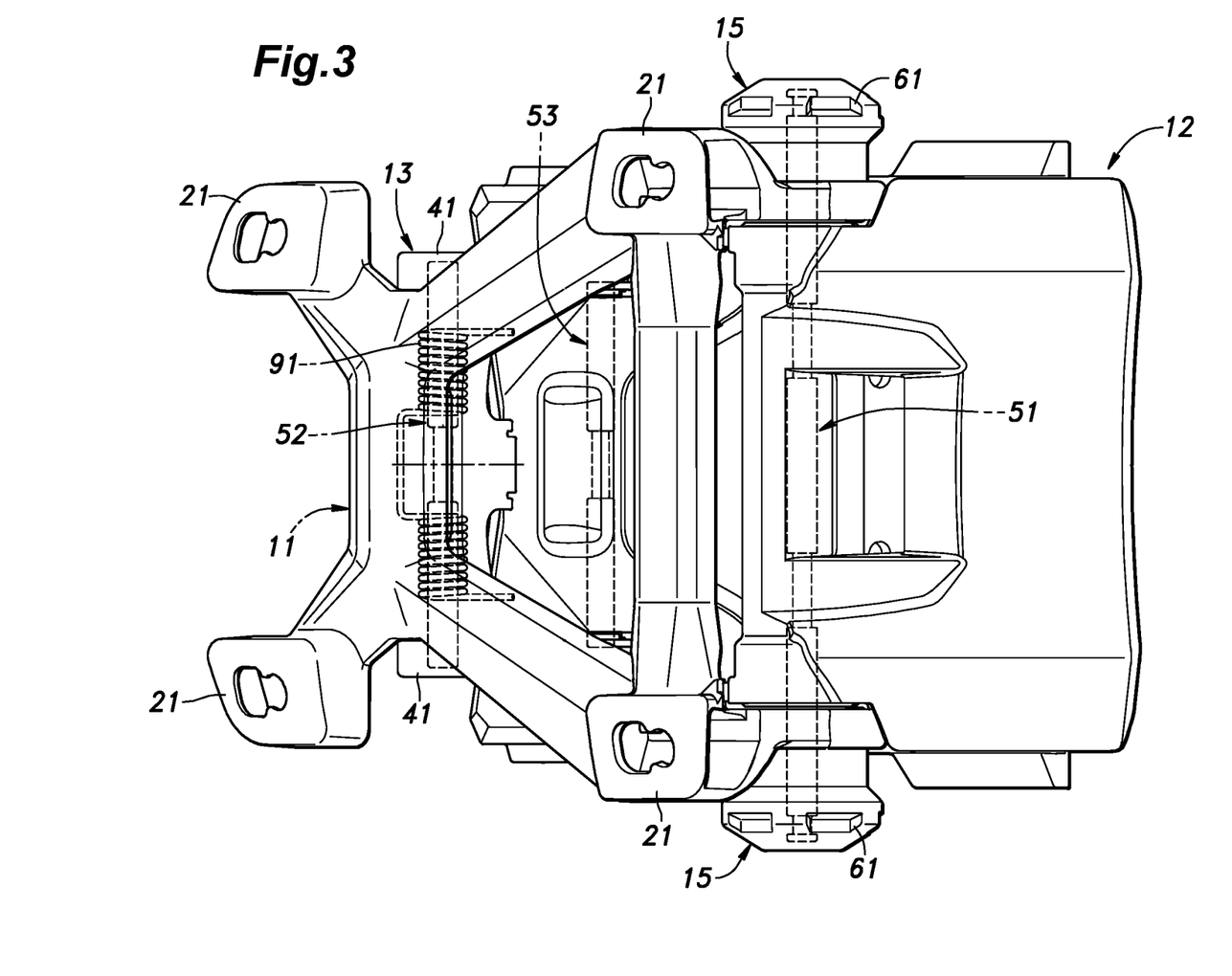
FIG. 3 is a plan view showing the screen adjuster.

Further, as shown in FIGS. 2 and 3, the screen adjuster 6 includes a first shaft 51 (first shaft member), a second shaft 52 (second shaft member), and a third shaft 53 (third shaft member). The first shaft 51, the second shaft 52, and the third shaft 53 may be made of a metal material.

The first shaft 51 rotatably couples the holder 11 and the bracket 12. The second shaft 52 rotatably couples the holder 11 and the arm 13. The third shaft 53 rotatably couples the arm 13 and the bracket 12. The first shaft 51, the second shaft 52, and the third shaft 53 are arranged parallel to each other so as to compose a link structure with three axes.

Next, a height adjusting mechanism of the screen adjuster 6 will be described.

Figure 4:
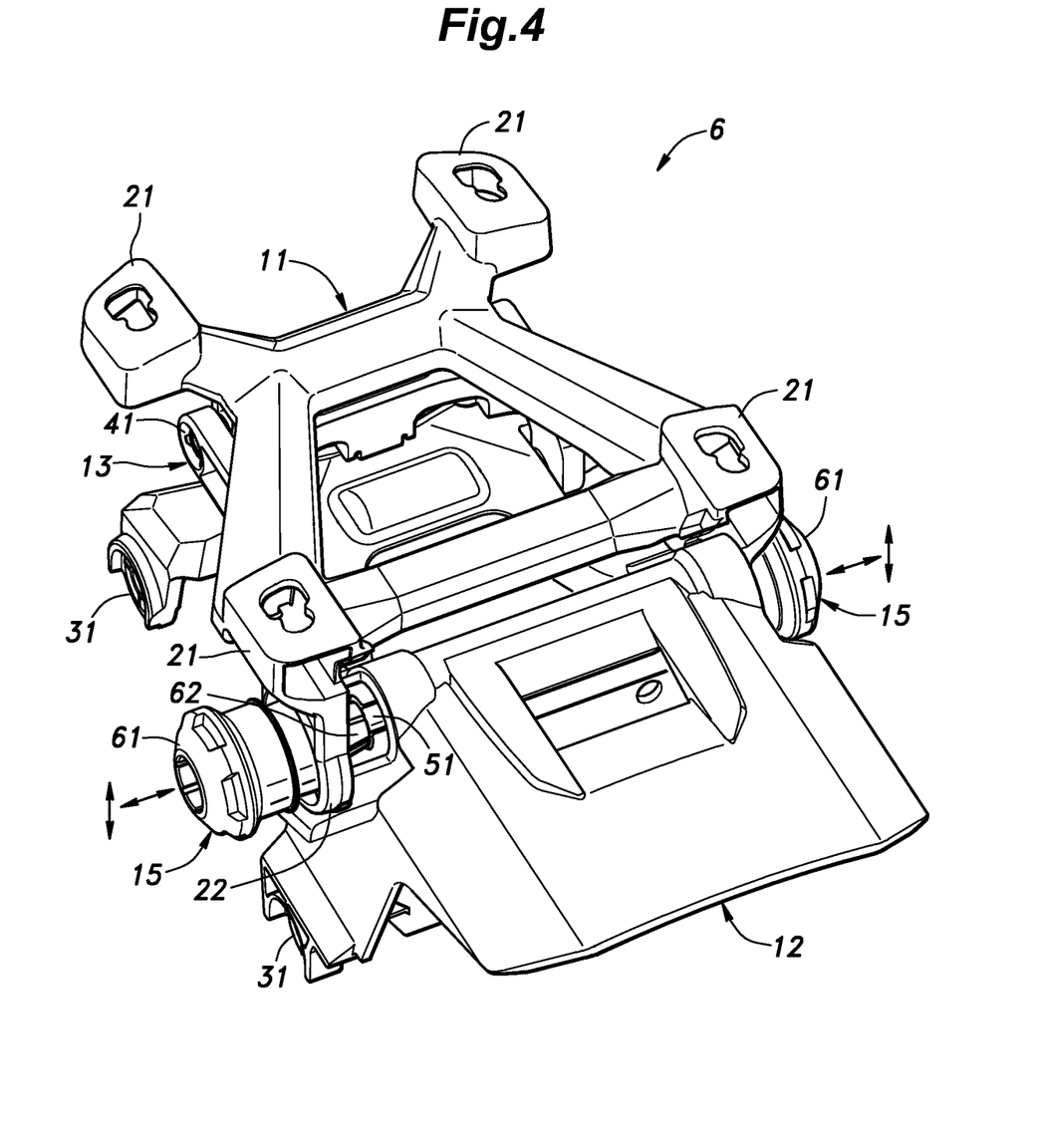
FIG. 4 is a perspective view showing the screen adjuster.

As shown in FIGS. 3 and 4, the screen adjuster 6 includes a pair of left and right operation members 15. Each operation member 15 is provided with a grip portion 61 the driver grips. Further, the operation members 15 are arranged at lateral ends of the first shaft 51.

Figure 5:
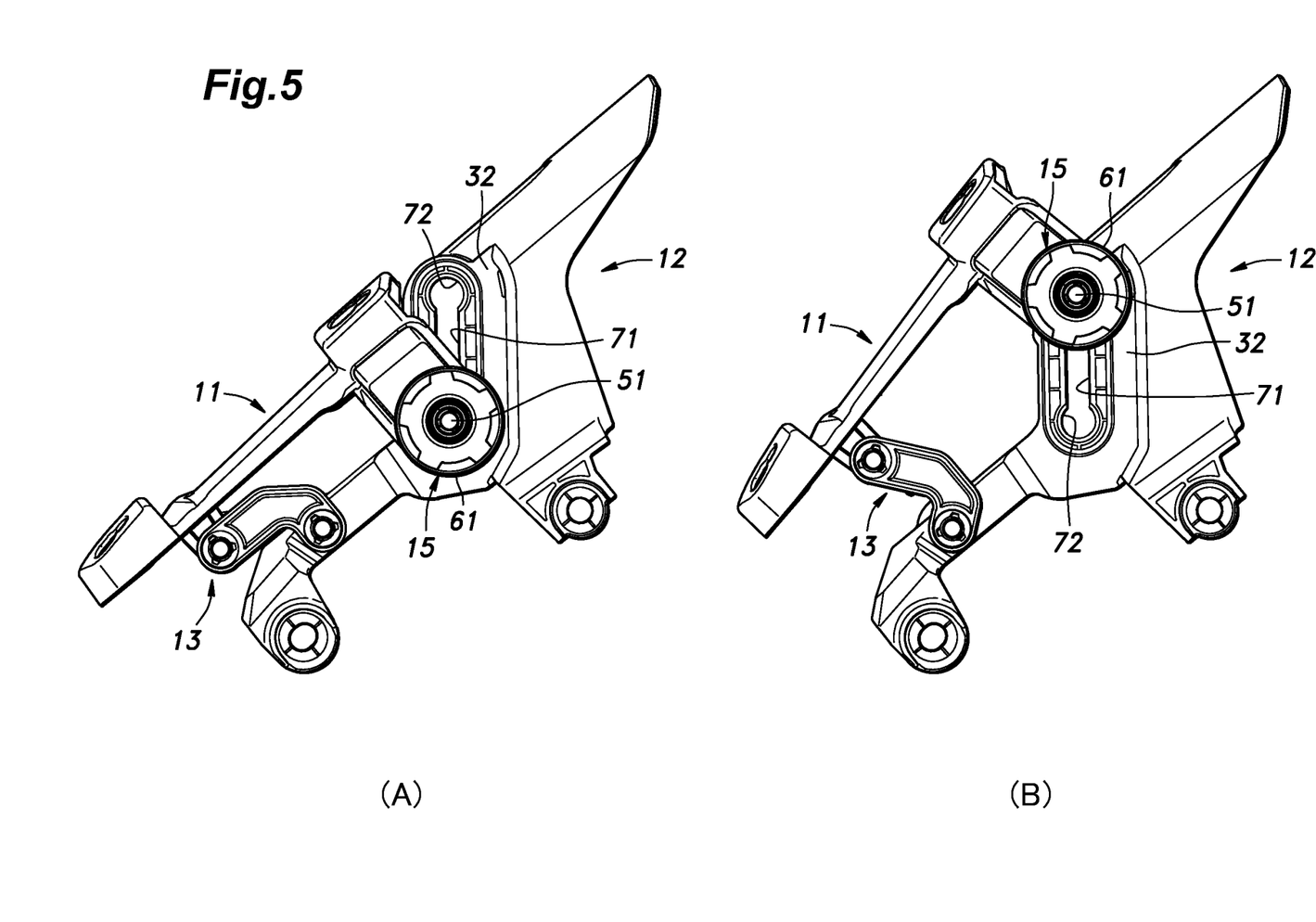
FIG. 5 is a side view showing a state transition (a low position state and a high position state) of the screen adjuster.

As shown in FIGS. 5(A) and 5(B), each slide guide portion 32 of the bracket 12 has a guide hole 71. This guide hole 71 is provided in each of the left and right slide guide portions 32. The guide hole 71 is formed so as to extend in the up-and-down direction.

When the driver grips the grip portion 61 of each operation member 15 and moves the grip portion 61 up and down, the first shaft 51 moves in the up-and-down direction along the guide hole 71. By this up-and-down operation, the holder 11 moves in the up-and-down direction, so that a low position state shown in FIG. 5(A) and a high position state shown in FIG. 5(B) can be switched.

In the low position state shown in FIG. 5(A), the first shaft 51 is arranged on a lower end side of the guide hole 71. In the high position state shown in FIG. 5(B), the first shaft 51 is arranged on an upper end side of the guide hole 71. Further, the arm 13 swings in response to the up-and-down movements of the first shaft 51 and the holder 11.

Next, lock mechanisms of the screen adjuster 6 will be explained.

The screen adjuster 6 includes lock mechanisms configured to hold the screen 5 and the holder 11 at a prescribed height. In the present embodiment, the screen 5 and the holder 11 are held in two positions of the low position and the high position.

As shown in FIGS. 5(A) and 5(B), lock portions 72, which are formed wider (have larger diameters) than the other portions, are provided at upper and lower end portions of the guide hole 71 of the bracket 12. Each lock portion 72 is gradually tapered from an outer surface side to an inner surface side of the bracket 12.

Figure 6:
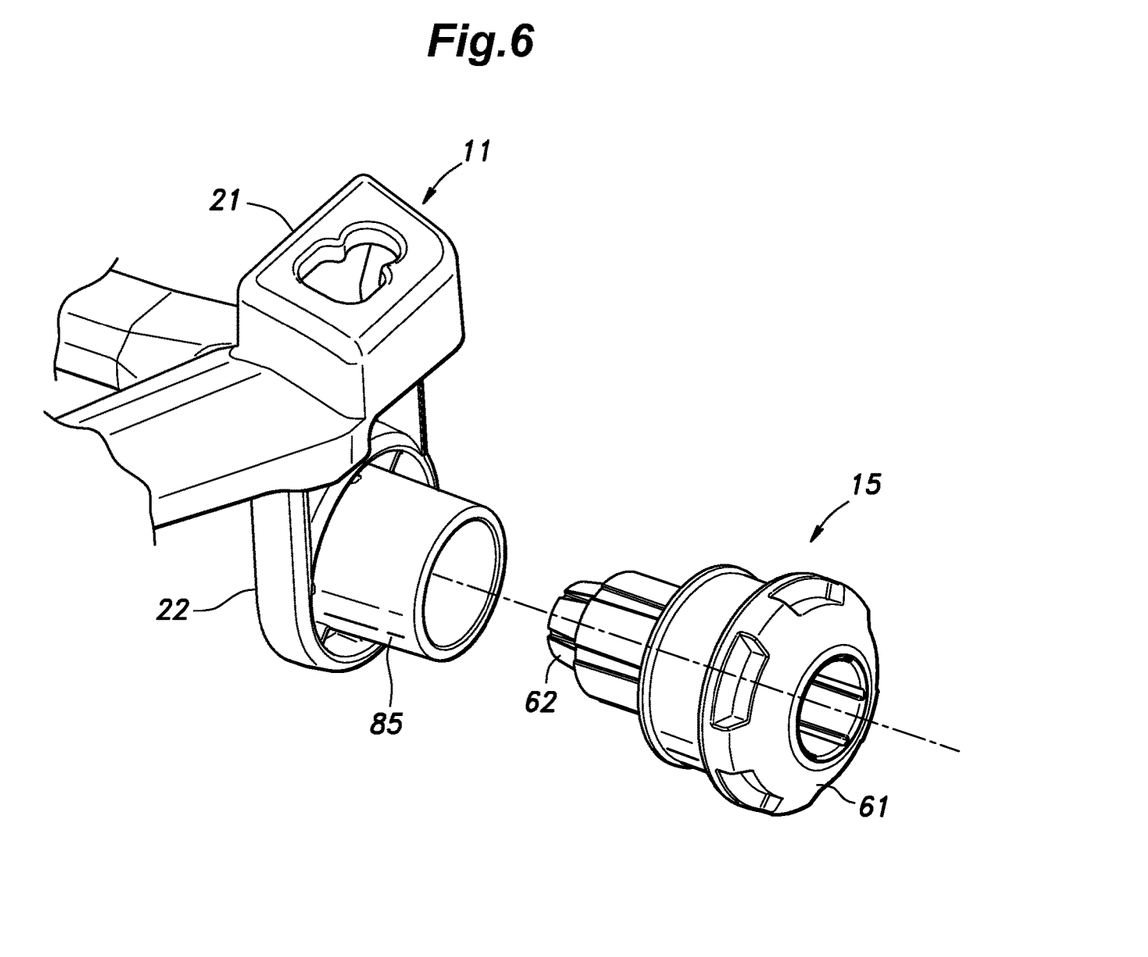
FIG. 6 is a perspective view showing an operation member and a main portion of a holder.

On the other hand, as shown in FIG. 6, each operation member 15 includes a fitted portion 62 configured to be fitted to each lock portion 72 of the bracket 12. The fitted portion 62 is tapered (formed in a truncated cone shape) such that shapes of the fitted portion 62 and the lock portion 72 complement each other.

Figure 7:
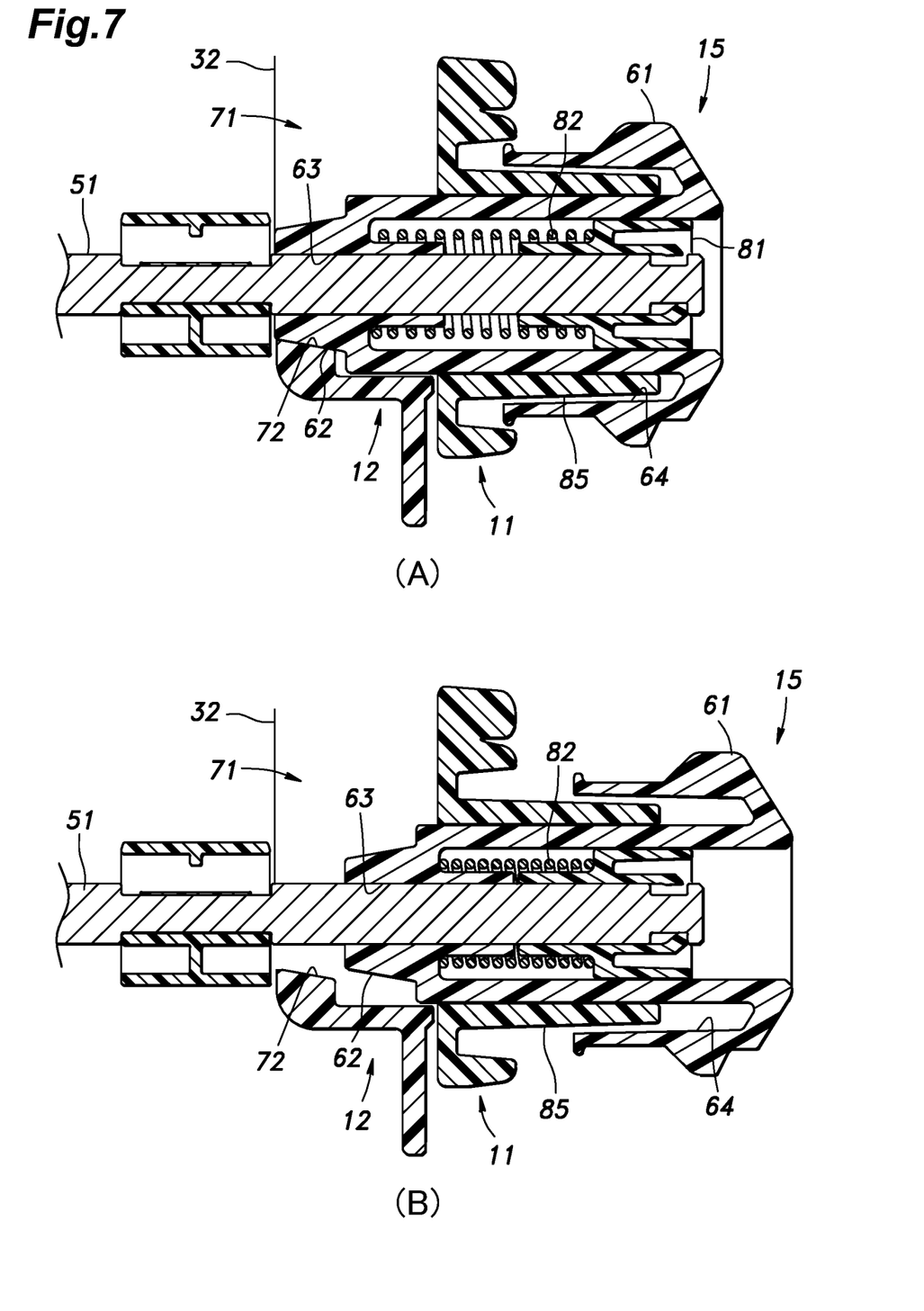
FIG. 7 is a cross-sectional view showing a state transition (a lock state and a lock release state) of a lock mechanism.

Accordingly, as shown in FIG. 7A, in a state where the fitted portion 62 of each operation member 15 is fitted to the lock portion 72 of the guide hole 71, the first shaft 51 cannot move along the guide hole 71, and thus a lock state to restrict the movement of the first shaft 51 is generated.

On the other hand, as shown in FIG. 7B, when the fitted portion 62 of each operation member 15 disengages from the lock portion 72 of the guide hole 71, a lock release state to allow the first shaft 51 to move along the guide hole 71 is generated.

At this time, the fitted portion 62 can be smoothly fitted to the lock portion 72 and looseness therebetween can be prevented in a state where the fitted portion 62 is fitted to the lock portion 72 since the lock portion 72 and the fitted portion 62 are gradually tapered in a direction in which the fitted portion 62 is fitted to the lock portion 72.

Further, as shown in FIGS. 5(A) and 5(B), a pair of upper and lower lock portions 72 are provided in the guide hole 71. The holder 11 is held in the low position in the lock state in which the fitted portion 62 of each operation member 15 is fitted to the lower lock portion 72, and the holder 11 is held in the high position in the lock state in which the fitted portion 62 of each operation member 15 is fitted to the upper lock portion 72.

Further, as shown in FIGS. 7(A) and 7(B), each operation member 15 is provided with a center hole 63. In this center hole 63, the first shaft 51 is inserted. Accordingly, the operation member 15 is supported by the first shaft 51 so as to slide with respect to the first shaft 51 in an axial direction thereof.

Further, a stopper 81 and a spring 82 (biasing member) are accommodated in each operation member 15. The stopper 81 prevents the operation member 15 from disengaging from the first shaft 51. The spring 82 consists of a coil spring, and the first shaft 51 is inserted therein. The spring 82 is attached between the operation member 15 and the stopper 81 in a compressed state. Accordingly, the operation member 15 is biased by the spring 82 in a direction in which the fitted portion 62 of the operation member 15 comes in pressure contact with the lock portion 72. Thus, the lock release state is generated when the grip portion 61 of the operation member 15 is pulled outward against a biasing force of the spring 82, and the lock state (initial state) is restored by the biasing force of the spring 82 when the pulling operation on the operation member 15 is stopped.

Further, as shown in FIG. 6, each first hinge portion 22 of the holder 11, to which each operation member 15 is attached, is provided with a cylindrical protrusion 85 protruding laterally. On the other hand, as shown in FIGS. 7(A) and 7(B), each operation member 15 is provided with a cylindrical recess 64 in which the cylindrical protrusion 85 of the holder 11 is fitted. Accordingly, the operation member 15 is supported by the holder 11 so as to be movable in the axial direction of the first shaft 51.

As shown in FIG. 4, a pair of left and right operation members 15 are provided. Further, a pair of left and right guide holes 71 are provided, and a pair of left and right lock mechanisms each composed of the fitted portion 62 of each operation member 15 and the lock portions 72 of each guide hole 71 are provided. Accordingly, the driver can move the operation members 15 up and down by gripping the grip portions 61 of the left and right operation members 15 with his/her left and right hands respectively, pulling the left and right operation members 15 outward at the same time, and setting the left and right lock mechanisms to the lock release state at the same time.

Next, an assist mechanism of the screen adjuster 6 will be described.

The screen adjuster 6 includes an assist mechanism configured to bias the holder 11 upward. More specifically, as shown in FIG. 3, an assist spring 91 is provided at a coupling portion of the holder 11 and the arm 13. The assist spring 91 consists of one or more torsion coil springs, in particular, two torsion coil springs coupled in series, namely, a double torsion spring. Both end arm portions of the assist spring 91 are locked by the holder 11, and a center arm portion of the assist spring 91 is locked by the arm 13. Further, the second shaft 52 coupling the holder 11 and the arm 13 is inserted in the assist spring 91.

As shown in FIG. 2, by a biasing force of the assist spring 91, a rotating force F1 that pushes and separates the holder 11 and the arm 13 is generated therebetween around the second shaft 52. Further, a rising force F2 that pushes the first shaft 51 upward along the guide hole 71 is generated.

By the assist spring 91, the holder 11 is always biased upward with respect to the bracket 12. Accordingly, it is possible to prevent looseness in respective coupling portions of the holder 11, the bracket 12, and the arm 13.

Further, when the low position state shifts to the high position state, the driver grips the grip portion 61 of each operation member 15 and performs an operation to raise the screen 5 and the holder 11. At this time, the biasing force of the assist spring 91 offsets the weights of the screen 5 and the holder 11, thereby reducing an operating force to raise the screen 5 and the holder 11. Accordingly, the operability (the feeling of an adjustment operation) is improved. Also, it is possible to prevent self-falling of the screen 5 and the holder 11 when the lock state is released in the high position.

Specific embodiments have been described in the foregoing, but the present invention should not be limited by the foregoing embodiments and various modifications are possible. For example, in the above embodiment, the angle (posture) of the screen 5 is changed as the height of the screen 5 is adjusted. However, only the height of the screen 5 may be adjusted, or only the angle (posture) of the screen 5 may be adjusted. Further, in the above embodiment, the lock portion 72 is gradually tapered in the direction in which the fitted portion 62 is fitted to the lock portion 72, and the fitted portion 62 is tapered such that shapes of the fitted portion 62 and the lock portion 72 complement each other. However, only one of the lock portion 72 and the fitted portion 62 may be tapered.

Glossary of Terms

1: windshield device
2: motorcycle (saddle-ride type vehicle)
3: vehicle body
5: screen (windshield member)
6: screen adjuster
7: vehicle body side member
11: holder (holding member)
12: bracket (attachment member)
13: arm (connecting member)
15: operation member
21: attachment portion
22: first hinge portion
23: second hinge portion
31: attachment portion
32: slide guide portion
33: hinge portion
41: first coupling portion
42: second coupling portion
51: first shaft (first shaft member)
52: second shaft (second shaft member)
53: third shaft (third shaft member)
61: grip portion
62: fitted portion
71: guide hole 72: lock portion
82: spring (biasing member)

The invention claimed is:

1. A windshield device arranged in front of a driver in a saddle-ride type vehicle, the windshield device comprising:
   a windshield member arranged such that at least one of a height and an angle thereof is adjustable;
   a holding member holding the windshield member;
   an attachment member fixed to a vehicle body and having a guide hole;
   a connecting member arranged between the holding member and the attachment member;
   a first shaft member rotatably coupling the holding member and the attachment member and configured to move along the guide hole;
   a second shaft member arranged parallel to the first shaft member and coupling the holding member and one end of the connecting member;
   a third shaft member arranged parallel to the first shaft member and coupling the attachment member and another end of the connecting member; and
   an operation member provided at an end portion of the first shaft member,
   wherein the operation member is configured to slide with respect to the first shaft member in an axial direction thereof and to shift between a lock state to restrict a movement of the first shaft member and a lock release state to permit the movement of the first shaft member.

2. The windshield device according to claim 1, wherein the guide hole is provided with at least two lock portions formed wider than other portions thereof,
   the operation member includes a fitted portion configured to be fitted to each lock portion, and
   when the fitted portion is fitted to the lock portion, the lock state to restrict the movement of the first shaft member along the guide hole is generated.

3. The windshield device according to claim 2, wherein at least one of the lock portion and the fitted portion is gradually tapered in a direction in which the fitted portion is fitted to the lock portion, and
   a biasing member configured to bias the operation member in a direction in which the fitted portion comes in pressure contact with the lock portion is provided.

4. A windshield device arranged in front of a driver in a saddle-ride type vehicle, the windshield device comprising:
   a windshield member arranged such that at least one of a height and an angle thereof is adjustable;
   a holding member holding the windshield member;
   an attachment member fixed to a vehicle body and having a guide hole;
   a connecting member arranged between the holding member and the attachment member;
   a first shaft member rotatably coupling the holding member and the attachment member and configured to move along the guide hole;
   a second shaft member arranged parallel to the first shaft member and coupling the holding member and one end of the connecting member;
   a third shaft member arranged parallel to the first shaft member and coupling the attachment member and another end of the connecting member; and
   an operation member provided at an end portion of the first shaft member,
   wherein the guide hole is formed so as to extend in an up-and-down direction in a side view, and positioned inside the operation member in a width direction so as to overlap with the operation member in the side view, and
   the operation member is configured to move straight in the up-and-down direction along the guide hole as being operated in the up-and-down direction.

5. The windshield device according to claim 4, wherein the connecting member is configured to swing in response to an up-and-down movement of the operation member provided at the end portion of the first shaft member.

* * * * *